(No Model.)
C. F. NEER.
THILL COUPLING.
No. 488,771. Patented Dec. 27, 1892.
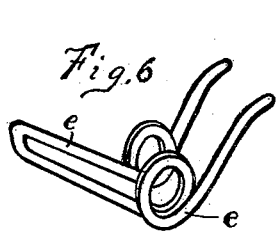
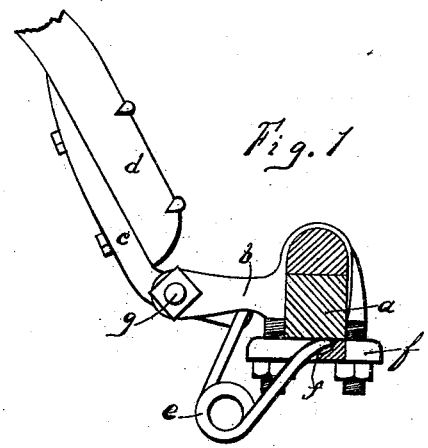
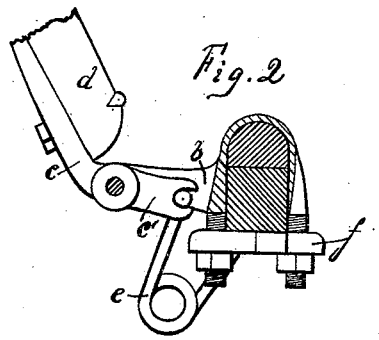
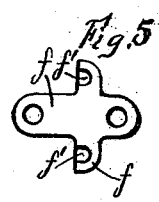
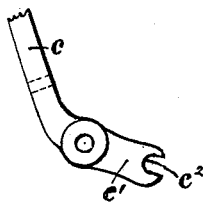
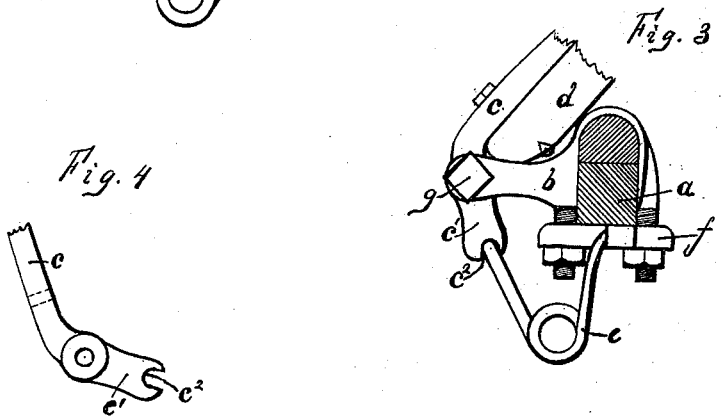
WITNESSES
D. H. Graham
Fred Ernest
INVENTOR
Charles F. Neer
BY Sol J. Houck
ATTORNEY
THE NORRIS PETERS CO., PHOTO-LITHO., WASHINGTON, D. C.

UNITED STATES PATENT OFFICE.

CHARLES F. NEER, OF CATAWBA, OHIO.

THILL-COUPLING.

SPECIFICATION forming part of Letters Patent No. 488,771, dated December 27, 1892.

Application filed August 29, 1891. Serial No. 404,074. (No model.)

*To all whom it may concern:*

Be it known that I, CHARLES F. NEER, a citizen of the United States, residing at Catawba, in the county of Clark and State of Ohio, have invented a new and useful Improvement in Thill-Couplings for Vehicles, of which the following is a specification.

My invention relates to improvements in thill couplings for buggies, carriages and other like vehicles, and the objects of my improvement, are; first to hold the thills or pole up when raised to about a perpendicular. Second to keep a constant and steady pressure upon the thill iron, when the thill or pole is in working position; thereby preventing any rattling or noise of the parts of the coupling when in use. I attain these objects by the mechanism illustrated in the accompanying drawings, in which—

Figure 1. is a side sectional view of the thills showing my improved coupling and my mode of attaching it to the axle. Fig. 2. is a sectional view showing my improved coupling and the position of the spring when a horse mule or other animal is attached to the thills. Fig. 3. is a sectional view showing the thills when thrown up and held in that position by the spring, Fig 4. is a side view of a section of the thill iron which forms a part of my improved coupling. Fig. 5. is a plan view of the plate on the under side of the axle, which is held in place by the jack-clip; it shows the recesses made to receive and hold the rear ends of the spring. Fig. 6. is a perspective view of the spring as I make it.

Similar letters refer to similar parts throughout the several views.

The letter $a$ designates the axle of a vehicle carrying the axle or jack clip $b$, secured by a plate $f$, and the usual nuts. In the forwardly extending branches of the clip is pivoted the thill iron $c$, to which is attached the thill $d$. The thill iron is pivoted on the bolt $g$, to the lugs of the axle clip, and has a rearward extension $c'$, notched as shown, to receive the bight of a spring $e$. This spring is coiled in two parts on each side of the forwardly extending bight or loop portion, which engages with the notched thill iron. The ends of this spring are held by notches $f'$ in the plate $f$. Fig. 6, shows the spring in its open inactive position. Figs. 1 and 2, show the loop portion bent up toward the axle by the normal position of the thill, when in use. The strain of spring is now practically neutral in its effect on the shaft, since the pivot $g$, the forward end of the spring, and the point of support,— are all in substantially the same line. The thills are thus free to move up and down with the horse motion, the spring being inoperative in this position of the thills. When the thills are thrown up as shown in Fig. 3, the forward end of the spring is carried out of line between the pivot $g$, and the point of support, and the spring coil exerts its tendency to hold the thills upward to best advantage. This form of spring does not require secure fastening at its ends, depending as it does, on the position of the parts to hold it in place. A mere notch $f'$ Fig. 5, is therefore sufficient to support it, together with its engagement at its forward end in the notch $c^2$ of the extension $c'$ of the thill iron. The peculiarity lies in the position of the forward end of the spring with regard to the pivot point $g$, so that it acts directly through said pivot when the thill is down, and thus neutrally on the shaft; and with its greatest leverage, when the thill is up, and when the extension $c'$ gives the greatest crank arm or leverage for the spring to act on, to maintain it in its upper position. Another point is that the spring is simply supported at its rear end by the notches $f'$, and the coiled portions may be at greater or less distance from the forward and rear ends of the spring, according to the degree of stiffness required. The supported end and the forward end of the spring are brought nearly together, and substantially in line with the pivot $g$, and the spring acts directly through said pivot, when the thills are down; and the forward end is thrown out of the line between the pivot and the rear end or point of support, when the thills are up.

Having thus fully described my invention what I claim as new and desire to secure by Letters Patent is:

1. In a thill coupling, the combination with an axle or jack clip thereon, and a thill iron pivoted to said clip and having a rearward extension from the pivot, provided with a notch, of a spring having a forward loop or bight portion mounted in said notch and also two branches coiled midway, and a supporting plate provided with notches to engage the rear ends of said spring and constitute a point of support,—the said extension engaged with the spring being substantially horizontal when the thills are down, and substantially vertical when the thills are up,—whereby the forward and rear ends of the spring will be brought nearer together when the thills are down, and the line of strain exerted by said spring, will be directly through the pivot, and thus practically neutral in its effect on the thills.

2. In a thill coupling, the combination with an axle, an axle clip thereon, and a thill iron and attached thill pivoted to said clip, and provided with a rearward extension having a notch, of a spring consisting of a forward loop portion mounted in said notch and coiled in each rearwardly extending branch portion, and a plate having notches for said rear ends adapted to allow their movement as a center of oscillation, and located so as to be substantially in line with the forward end of the spring on the pivot of the thill iron when the thills are down, whereby the spring is neutral in its effect on the thills when the latter are lowered and the spring may swing about its point of support at its rear end as a center, and act on the thill iron with maximum leverage when the thills are up.

In testimony whereof I affix my signature in the presence of two witnesses.

CHARLES F. NEER.

Witnesses:
R. D. BALDUM,
D. F. GRAHAM.